US009096270B2

(12) United States Patent
Kojima

(10) Patent No.: US 9,096,270 B2
(45) Date of Patent: Aug. 4, 2015

(54) PILLAR STRUCTURE FOR VEHICLE

(71) Applicant: Fuji Jukogyo Kabushiki Kaisha, Tokyo (JP)

(72) Inventor: Naoki Kojima, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/027,360

(22) Filed: Sep. 16, 2013

(65) Prior Publication Data

US 2014/0084630 A1 Mar. 27, 2014

(30) Foreign Application Priority Data

Sep. 27, 2012 (JP) ................................ 2012-215072

(51) Int. Cl.
B62D 25/04 (2006.01)

(52) U.S. Cl.
CPC ...................................... *B62D 25/04* (2013.01)

(58) Field of Classification Search
CPC ..................................................... B62D 25/04
USPC .................... 296/208, 180.1, 203.01–203.04, 296/193.06, 193.05, 213; 454/123, 124, 454/141, 147, 164, 165, 158
See application file for complete search history.

(56) References Cited

U.S. PATENT DOCUMENTS

| 2,667,113 | A | * | 1/1954 | Ackermans | .................... 454/141 |
| 4,538,851 | A | * | 9/1985 | Taylor | ......................... 296/180.1 |
| 4,898,458 | A | * | 2/1990 | McDonald | ..................... 359/509 |
| 5,162,019 | A | * | 11/1992 | Widmaier et al. | ............. 454/147 |
| 2011/0000727 | A1 | * | 1/2011 | Froeschle et al. | ............. 180/68.1 |

FOREIGN PATENT DOCUMENTS

| JP | S52-16134 | 2/1977 |
| JP | S57-200480 | 12/1982 |
| JP | S58-160879 | 10/1983 |
| JP | S59-67375 | 5/1984 |
| JP | S59-179154 | 11/1984 |
| JP | S62-65370 | 4/1987 |
| JP | S63-162685 | 10/1988 |
| JP | 2011-5939 A | 1/2011 |

\* cited by examiner

*Primary Examiner* — Dennis H Pedder
(74) *Attorney, Agent, or Firm* — Smith, Gambrell & Russell, LLP

(57) ABSTRACT

A pillar structure for a vehicle includes: a glass to form a vehicle compartment; a pillar to support a roof panel; and a pillar outer cover disposed at an outer side of the pillar. A flow passage is provided between the pillar and the pillar outer cover. The flow passage includes an inlet port, an air-water separator, an air outlet port, and a discharge port. The air outlet port is disposed at a position with a pressure lower than a pressure in a vicinity of the inlet port during running of the vehicle.

13 Claims, 2 Drawing Sheets

US 9,096,270 B2

PILLAR STRUCTURE FOR VEHICLE

CROSS-REFERENCE TO RELATED APPLICATIONS

The present application claims priority from Japanese Patent Application No. 2012-215072 filed on Sep. 27, 2012, the entire contents of which are hereby incorporated by reference.

BACKGROUND

1. Technical Field

The present invention relates to pillar structures which support a roof panel of a vehicle body.

2. Related Art

A conventional pillar structure for a vehicle includes a windshield disposed on the front side of a vehicle, front doors disposed on both widthwise sides of the vehicle body, a front pillar disposed between the windshield and each front door, and a pillar outer cover disposed on the outer surface of each front pillar. A step is formed between the windshield and each pillar outer cover (for instance, see Japanese Unexamined Patent Application Publication No. 2011-5939). With this pillar structure, when a vehicle is running in the rain, rain water which flows over the front surface of the windshield outwardly in the width direction is caused to flow along the step between the windshield and each pillar outer cover, whereby the flow of rain water to the glass of each front door is regulated, and the field of view in the lateral direction is secured when the vehicle is running in the rain.

With the above-mentioned pillar structure, the flow of air becomes turbulent due to the step between the windshield and each pillar outer cover when the vehicle is running, and thus air resistance may increase. In addition, when snow adhering to the windshield is wiped away by a wiper when the vehicle is running in the snowfall, the snow wiped away by the wiper is deposited on the step between the windshield and each pillar outer cover, and thus necessary field of view may not be assured. Furthermore, with the pillar structure, the step between the windshield and each pillar outer cover may decrease the appearance of the vehicle design.

SUMMARY OF THE INVENTION

It is an object of the present invention to provide a pillar structure for a vehicle, the structure being capable of reducing the air resistance during running of a vehicle, increasing snow removal performance in the snow, and enhancing the appearance of the vehicle.

An aspect of the present invention provides a pillar structure for a vehicle, the structure including: a glass to form a vehicle compartment; a pillar to support a roof panel disposed at an upper side of the vehicle compartment; and a pillar outer cover disposed at an outer side of the pillar; a flow passage disposed between the pillar and the pillar outer cover, the flow passage allowing air and rain water to be flown through, the air and rain water flowing over an outer surface of the glass due to running of a vehicle. The flow passage includes: an inlet port to allow the air and rain water to flow in, an air-water separator to separate the air and rain water which have flowed from the inlet port, an air outlet port to flow out the air which has been separated from the rain water by the air-water separator, and a discharge port to discharge rain water in a direction pointing other than the glass, the rain water having been separated from the air by the air-water separator, the air outlet port being disposed at a position with a pressure lower than a pressure in a vicinity of the inlet port during running of the vehicle.

DETAILED DESCRIPTION

Figure 1:
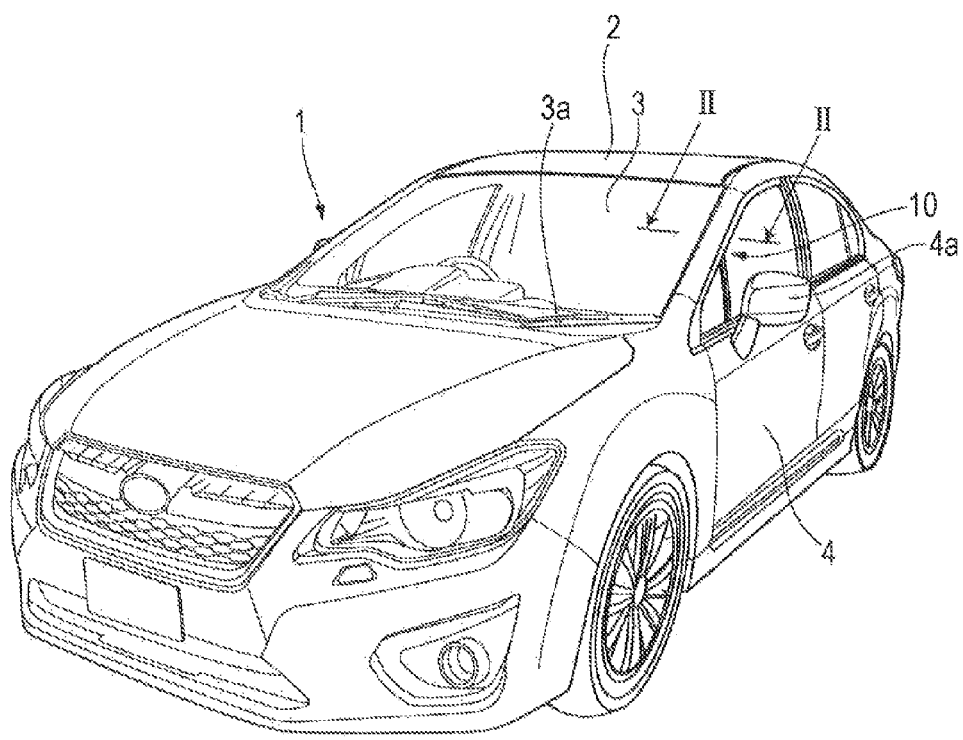
FIG. 1 is a perspective view of a vehicle according to an example of the present invention.
Figure 2:
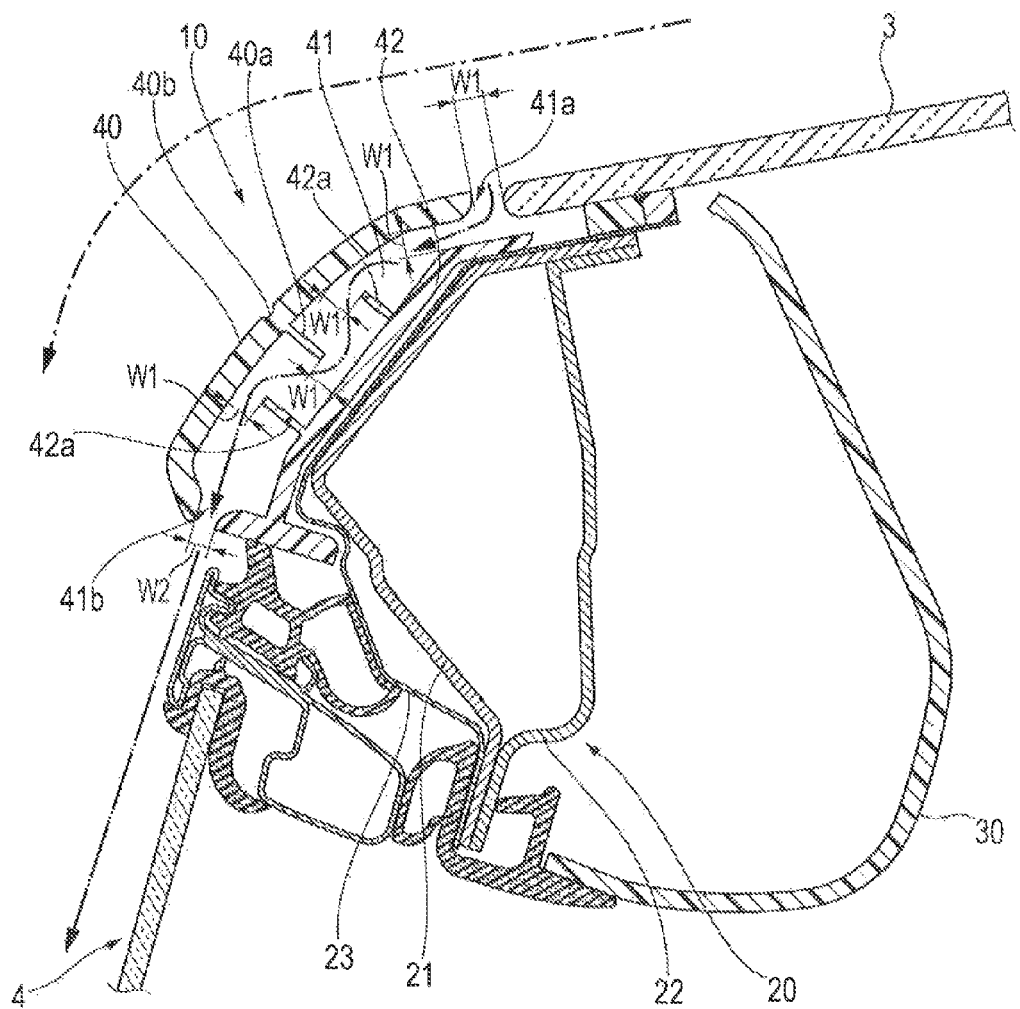
FIG. 2 is a cross-sectional view taken along line II-II of FIG. 1.

FIGS. 1 and 2 each illustrate an example of the present invention. FIG. 1 is a perspective view of a vehicle. FIG. 2 is a cross-sectional view taken along line II-II of FIG. 1.

As illustrated in FIG. 1, a vehicle 1 includes a roof panel 2 disposed at the upper side of a vehicle compartment, a windshield 3 disposed at the front side of the vehicle compartment, front doors 4 disposed on both widthwise sides of the vehicle compartment, and a front pillar unit 10 disposed between the windshield 3 and each of the front doors 4. The bottom of the front surface of the windshield 3 is provided with a wiper 3a to wipe away rain water and snow adhering to the windshield 3. The front door 4 is provided with a door mirror 4a at a position in the vicinity of the lower end of the front pillar 10.

As illustrated in FIG. 2, the front pillar unit 10 includes a front pillar 20, a pillar inner cover 30 disposed on the inner side (vehicle compartment side) of the front pillar 20, and a pillar outer cover 40 disposed on the other (outer) side of the front pillar 20.

The front pillar 20 has a pillar reinforcement panel 21, a pillar inner panel 22 disposed on the inner side (vehicle compartment side) of the pillar reinforcement panel 21, and a pillar outer panel 23 disposed on the other (outer) side of the pillar reinforcement panel 21. These members 21, 22 and 23 are integrally formed so that the strength of the front pillar 20 is secured.

The pillar inner cover 30 is a member composed of for instance, synthetic resin, and covers the front pillar 20 from the inside of the vehicle compartment.

The pillar outer cover 40 is a member composed of, for instance, synthetic resin, and covers the pillar outer panel 23 disposed between the windshield 3 and the front door 4 from the outside. The outer surface of the pillar outer cover 40 near the windshield 3 is formed to have approximately the same height as the outer surface of the part of the windshield 3 that is adjacent to the pillar outer cover 40. A flow passage formation plate 42 to form a flow passage 41 between the pillar outer cover 40 and the front pillar 20 is provided therebetween along the outer surface of the pillar outer panel 23 of the front pillar 20. The flow passage 41 allows air and rain water flowing over the outer surface of the windshield 3 to be flown through during running of the vehicle 1. The outer surface of the pillar outer cover 40 near the windshield 3 does not necessarily have to have strictly the same height as the outer surface of the part of the windshield 3 which is adjacent to the pillar outer cover 40, but may have 2 to 3 nm of difference of height.

The pillar outer cover 40 is provided with at least one rib 40a that projects toward the flow passage formation plate 42 and extends in the longitudinal direction of the pillar outer cover 40. The flow passage formation plate 42 is provided with at least one rib 42a that projects toward the pillar outer cover 40 and extends in the longitudinal direction of the flow passage formation plate 42. Thus, the flow passage 41 is formed so as to extend meandering from the windshield 3 to the front door 4 because of the ribs 40a and 42a. The end of the rib 40a projects from the pillar outer cover 40 in a slanting direction with respect to the front-rear direction of the vehicle 1 inwardly of the vehicle 1 in the vehicle width direction. The end of the rib 42a projects from the flow passage formation plate 42 in a slanting direction with respect to the front-rear direction of the vehicle 1 outwardly of the vehicle 1 in the vehicle width direction.

The flow passage 41 includes an inlet port 41a to receive air and rain water flowing over the outer surface of the windshield 3, an air outlet port 41b to separate air and rain water which flow into the flow passage 41 and flow out the separated air, and a discharge port (not illustrated) to discharge the rain water which has flown into the flow passage 41 and has been separated from the air.

The inlet port 41a is disposed in a space between the windshield 3 and the pillar outer cover 40, and is open frontward in the vertical direction along the space. The inlet port 41a is formed to have a predetermined width dimension W1 which is the dimension of the space between the windshield 3 and the pillar outer cover 40. The width dimension between each end of the ribs 40a and 42a in the flow passage 41 and the point on the pillar outer cover 40 or the flow passage formation plate 42 that is located on the extension of corresponding one of the ribs 40a and 42a is formed to be approximately the same as the width dimension W1 of the inlet port 41a, i.e., the space between the windshield 3 and the pillar outer cover 40.

The air outlet port 41b is open rearward in the vicinity of the front door 4 in the vertical direction along the space between the pillar outer cover 40 and the flow passage formation plate 42. The air outlet port 41b, i.e., the space between the pillar outer cover 40 and the flow passage formation plate 42 is formed to have a predetermined width dimension W2 which is less than the width dimension W1 of the inlet port 41a (W2<W1). That is to say, the air outlet port 41b is formed to have an opening area smaller than the opening area of the inlet port 41a.

The discharge port is open outward in a direction pointing other than the glass of the front door 4 in the vicinity of the lower end and the upper end of the front pillar 20.

At the center of the outer surface of the pillar outer cover 40 in the short-length direction, a groove 40b to guide rain water to the lower end or the upper end of the front pillar 20 is formed so as to extend in the longitudinal direction, the rain water adhering to the outer surface of the pillar outer cover 40.

In the pillar structure configured in the above manner, most of air on both widthwise sides of the windshield 3 of the vehicle 1 during running flows along the outer surface of the pillar outer cover 40 the dashed dotted line of FIG. 2), while part of the air flows into the flow passage 41 from the inlet port 41a, flows meandering through the flow passage 41 (the chain double-dashed line of FIG. 2), flows out from the air outlet port 41b, and flows toward the rear of the vehicle 1 along the outer surface of the glass of the front door 4.

When the vehicle 1 is running, the vicinity of the front pillar unit 10 on the lateral side of the vehicle 1 which is provided with the air outlet port 41b has a pressure lower than the pressure of the vicinity of the front pillar unit 10 at the front side of the vehicle 1 which is provided with the inlet port 41a. The air flowing through the flow passage 41 is regulated to a predetermined flow rate by a difference between the pressures at the inlet port 41a and the air outlet port 41b.

Since the width dimension W2 of the air outlet port 41b is formed to be smaller than the width dimension W1 of the inlet port 41a, the velocity of the air which flows out from the flow passage 41 becomes higher than the velocity of the air which flows into the flow passage 41.

Rain water adhering to the windshield 3 is wiped away by the wiper 3a during running of the vehicle 1 in the rain, and part of the rain water flows to both widthwise sides of the windshield 3. The rain water on both widthwise sides of the windshield 3 flows into the flow passage 41 with air through the inlet port 41a which is disposed between the windshield 3 and the pillar outer cover 40, and comes into contact with the ribs 40a and 42a to be separated from the air. The rain water separated from the air flows along the ribs 40a and 42a, and is discharged from the discharge port at the lower end or the upper end of the front pillar 20 in a direction pointing other than the glass of the front door 4. Thus, the rain water separated in the flow passage 41 does not flow along the glass of the front door 4, but flows on the underside of the front door 4 or the upper surface of the roof panel 2. The air separated from the rain water flows meandering through the flow passage 41, flows out from the air outlet port 41b, and flows toward the rear of the vehicle 1 along the outer surface of the glass of the front door 4. Consequently, rain water falling to the glass of the front door 4 is blown away by the air flowing out from the air outlet port 41b, and thus the adhesion of rain water to the glass of the front door 4 is reduced.

When the vehicle 1 is running in the snowfall, snow adhering to the windshield 3 is wiped away by the wiper 3a, and part of the snow are moved to both widthwise sides of the windshield 3. Since the outer surface of the windshield 3 of the pillar outer cover 40 has approximately the same height as the outer surface of the part of the windshield 3 which is adjacent to the pillar outer cover 40, snow does not stay on both widthwise sides of the windshield 3, and it is possible to drop snow on the lateral side of the vehicle 1.

Accordingly, in the pillar structure for a vehicle in the example, the flow passage 41 is disposed between the front pillar 20 and the pillar outer cover 40, the flow passage 41 allowing the air and rain water, which flows over the outer surface of the windshield 3 due to running of the vehicle 1, to be flown through. The flow passage 41 includes the inlet port 41a to receive air and rain water which flows over the front surface of the windshield 3, the ribs 40a and 42a which come into contact with the rain water which has flown in from the inlet port 41a so as to separate air from the rain water, the air outlet port 41b to flow out air toward the front door 4, the air being separated from the rain water by the ribs 40a and 42a, and the discharge port for discharging rain water in a direction pointing other than the glass of the front door 4, the rain water being separated from the air by the ribs 40a and 42a. Thus, the outer surface of the pillar outer cover 40 can be formed to have approximately the same height as the outer surface of the part of the windshield 3 which is adjacent to the pillar outer cover 40. As a result, the air resistance during running of the vehicle 1 can be reduced, deposition of snow on both widthwise sides of the windshield 3 can be prevented during running of the vehicle 1 in the snow, and the appearance of the vehicle 1 can be enhanced.

The vicinity of the front pillar unit 10 on the side of the vehicle 1 is provided with the air outlet port 41b, the vicinity having a lower pressure during running of the vehicle 1 than the pressure of the vicinity of the front pillar unit 10 at the front side of the vehicle 1 which is provided with the inlet port 41a. Consequently, the flow amount of the air and rain water which flow along the flow passage 41 can be increased, and thus the rain water, which flows toward the front pillar unit 10 over the outer surface of the windshield 3, can be reliably made to flow along the flow passage 41, and external visibility from the vehicle compartment through the glass of the front door 4 can be further improved.

The air outlet port 41b is formed to have an opening area smaller than the opening area of the inlet port 41a. Consequently, the velocity of the air which flows out from the air outlet port 41b can be increased higher than the velocity of the air which flows into the inlet port 41a, whereby rain water falling to the glass of the front door 4 can be reliably blown away by the air flowing out from the air outlet port 41b. As a result, external visibility from the vehicle compartment through the glass of the front door 4 can be further improved.

In the above-described example, the front pillar unit 10 is configured such that the outer surface of the windshield 3 of the pillar outer cover 40 has the same height as the height of the outer surface of the part of the windshield 3 which is adjacent to the pillar outer cover 40. However, the present invention is not limited to this. For instance, in a rear pillar unit provided between the glass located at the lateral side of the rear of the vehicle 1 and the rear glass located at the rear side of the vehicle compartment, the outer surface of the rear pillar unit, the outer surface being located on the lateral side of the vehicle may be configured to have the same height as the outer surface of the glass located in the rear of the lateral side of the vehicle 1, the outer surface being near the rear pillar unit. In this case, an inlet port is provided between the glass located in the rear of the lateral side of the vehicle 1 and the rear pillar unit, and an air outlet port is provided at the rear side of the vehicle 1, the rear side having a pressure lower than the pressure in the vicinity of the inlet port during running of the vehicle 1. Accordingly, rain water flowing rearwardly of the lateral side of the vehicle 1 can be regulated to the rear glass on the rear side of the vehicle 1.

In the above-described example, when the vehicle 1 is running, the vicinity of the front pillar unit 10 on the lateral side of the vehicle 1 which is provided with the air outlet port 41b has a pressure lower than the pressure of the vicinity of the front pillar unit 10 at the front side of the vehicle 1 which is provided with the inlet port 41a. However, the present invention is not limited to this. As far as the portion of the vehicle 1 having a lower pressure during running of the vehicle 1 than the pressure of the vicinity portion provided with the inlet port 41a is communicated with the flow passage 41 and provided with an air outlet port, an air outlet port may be provided, for instance, at the front end of the roof panel 2 of the vehicle 1.

In the above example, the air outlet port 41h is formed to have the width dimension W2 smaller than the width dimension W1 of the inlet port 41a, and is open rearward in the vicinity of the front door 4 in the vertical direction along the space between the pillar outer cover 40 and the flow passage formation plate 42. However, the present invention is not limited to this. As far as the opening area of the air outlet port 41b is formed to be smaller than the opening area of the inlet port 41a, the air outlet port 41b may be formed to have the same width dimension as the width dimension of the inlet port 41a, and the air outlet port 41b may have a dimension in the longitudinal direction shorter than the dimension in the longitudinal direction of the inlet port 41a. In this case, the position of the air outlet port 41b preferably is defined so as to have the lowest pressure among positions of the front pillar unit 10 in the vertical direction during running of the vehicle 1.

In the above example, the pillar outer cover 40 is provided one piece of the rib 40a, and the flow passage formation plate 42 is provided with two pieces of the rib 42a. However, the present invention is not limited to this. For instance, either one of the pillar outer cover 40 and the flow passage formation plate 42 may be provided with one rib, or both of the pillar outer cover 40 and the flow passage formation plate 42 may be provided with a plurality of ribs.

In the above example, the pillar outer cover 40 and the flow passage formation plate 42 are provided with the ribs 40a and 42a, thereby separating air and rain water which have flown into the flow passage 41 from each other. However, the present invention is not limited to this. For instance, the flow passage 41 may be provided with a reticulated member that comes into contact with rain water to separate air from the rain water, or the flow passage 41 may be provided with an air-water separation membrane which allows only gas to pass through.

In the above example, the flow passage formation plate 42 to form the flow passage 41 is provided between pillar outer cover 40 and the front pillar 20. However, the present invention is not limited to this. A flow passage may be formed between the pillar outer cover 40 and the front pillar 20 without using the flow passage formation plate 42. In this case, similar effects to those in the above-described example may be obtained by forming ribs directly on the front pillar 20.

The invention claimed is:

1. A pillar structure for a vehicle, the structure comprising:
   glass to form a vehicle compartment, including a first glass and a second glass;
   a pillar to support a roof panel disposed at an upper side of the vehicle compartment;
   a pillar outer cover provided at an outer side of the pillar, with an outer surface of the pillar outer cover that is adjacent the first glass being at approximately the same height as an outer surface of the first glass that is adjacent the pillar outer cover;
   a flow passage disposed between the pillar and the pillar outer cover, the flow passage allowing air and rain water that flows over an outer surface of the first glass due to running of a vehicle to flow therethrough;
   an inlet port provided to the flow passage, the inlet port being configured to allow the air and rain water to flow into the flow passage;
   an air-water separator provided to the flow passage, the air-water separator configured to separate air and rain water which have flowed from the inlet port as a mixture of air and rain water, the air-water separator configured to discharge rain water that is separated from the air in a direction other than a direction toward the second glass; and
   an air outlet port provided to the flow passage, the air outlet port being configured to flow out the air which has been separated from the rain water by the air-water separator, the air outlet port being disposed at a position with a pressure lower than a pressure in a vicinity of the inlet port during running of the vehicle, the air outlet port being configured to direct the flown out air in a direction corresponding with a direction along which a surface of the second glass extends.

2. The pillar structure for a vehicle according to claim 1, wherein
   the air outlet port is open in a direction in which the flown out air flows along an outer surface of the second glass located at a surface of the vehicle which is provided with the air outlet port; and
   the air outlet port is formed to have an opening area smaller than an opening area of the inlet port.

3. The pillar structure for a vehicle according to claim 2, wherein
   the pillar is a front pillar to support a front side of the roof panel; and the air and rain water, which have flown over the outer surface of the first glass provided at a front side of the vehicle, are flown into the flow passage, and the air and rain water are separated by the air-water separator and the air separated from the rain water is flown along the outer surface of the second glass, with the second glass forming part of a front door.

4. The pillar structure for a vehicle according to claim 1, wherein the air-water separator is formed so as to extend in a longitudinal direction of the pillar, and has a rib which comes into contact with the rain water which flows through the flow passage so as to allow the air and the rain water to be separated from each other.

5. The pillar structure for a vehicle according to claim 2, wherein the air-water separator is formed so as to extend in a longitudinal direction of the pillar, and has a rib which comes into contact with the rain water which flows through the flow passage so as to allow the air and the rain water to be separated from each other.

6. The pillar structure for a vehicle according to claim 3, wherein the air-water separator is formed so as to extend in a longitudinal direction of the pillar, and has a rib which comes into contact with the rain water which flows through the flow passage so as to allow the air and the rain water to be separated from each other.

7. The pillar structure for a vehicle according to claim 1, wherein
the first glass is a region of glass at a forward length of an airflow that enters the flow passage via the inlet port, and the second glass is a region of glass at a rearward length of an airflow that exits the flow passage via the outlet port.

8. The pillar structure for a vehicle according to claim 1, wherein the inlet port opens in a frontward direction, relative to a front-back vehicle direction.

9. The pillar structure for a vehicle according to claim 1, wherein the inlet port opens in a direction perpendicular to an outer surface of the first glass that is adjacent the inlet port.

10. The pillar structure for a vehicle according to claim 1, wherein the air-water separator comprises a number of ribs that project into the flow passage for separating water from a mixture of air and water that flows through the flow passage.

11. The pillar structure for a vehicle according to claim 10, wherein a projecting length of the ribs of the air-water separator is such that an airflow clearance at the ribs is approximately the same as an opening area of the inlet port.

12. A pillar structure for a vehicle, the structure comprising:
glass to form a vehicle compartment, including a first glass and a second glass;
a pillar to support a roof panel disposed at an upper side of the vehicle compartment;
a pillar outer cover provided at an outer side of the pillar, with an outer surface of the pillar outer cover that is adjacent the first glass being approximately level with an outer surface of the first glass that is adjacent the pillar outer cover;
a flow passage disposed between the pillar and the pillar outer cover, the flow passage allowing air and rain water that flows over an outer surface of the first glass due to running of a vehicle to flow therethrough;
an inlet port provided to the flow passage, the inlet port being configured to allow the air and rain water to flow into the flow passage;
an air-water separator provided to the flow passage, the air-water separator configured to separate air and rain water which have flowed from the inlet port as a mixture of air and rain water, the air-water separator configured to discharge rain water that is separated from the air in a direction other than a direction toward the second glass; and
an air outlet port provided to the flow passage, the air outlet port being configured to flow out the air which has been separated from the rain water by the air-water separator, the air outlet port being disposed at a position with a pressure lower than a pressure in a vicinity of the inlet port during running of the vehicle, the air outlet port being configured to direct the flown out air in a direction corresponding with a direction along which a surface of the second glass extends.

13. A pillar structure for a vehicle, the structure comprising:
glass to form a vehicle compartment, including a first glass and a second glass;
a pillar to support a roof panel disposed at an upper side of the vehicle compartment;
a pillar outer cover provided at an outer side of the pillar, with an outer surface of the pillar outer cover that is adjacent the first glass extending along a common trajectory as an outer surface of the first glass that is adjacent the pillar outer cover;
a flow passage disposed between the pillar and the pillar outer cover, the flow passage allowing air and rain water that flows over an outer surface of the first glass due to running of a vehicle to flow therethrough;
an inlet port provided to the flow passage, the inlet port being configured to allow the air and rain water to flow into the flow passage;
an air-water separator provided to the flow passage, the air-water separator configured to separate air and rain water which have flowed from the inlet port as a mixture of air and rain water, the air-water separator configured to discharge rain water that is separated from the air in a direction other than a direction toward the second glass; and
an air outlet port provided to the flow passage, the air outlet port being configured to flow out the air which has been separated from the rain water by the air-water separator, the air outlet port being disposed at a position with a pressure lower than a pressure in a vicinity of the inlet port during running of the vehicle, the air outlet port being configured to direct the flown out air in a direction corresponding with a direction along which a surface of the second glass extends.

* * * * *